(12) United States Patent
Lee et al.

(10) Patent No.: US 9,667,327 B2
(45) Date of Patent: May 30, 2017

(54) METHOD AND APPARATUS FOR CHANNEL-RELATED INFORMATION FEEDBACK IN A BEAMFORMING SYSTEM

(71) Applicant: Samsung Electronics Co., Ltd, Gyeonggi-do (KR)

(72) Inventors: Nam-Jeong Lee, Suwon-si (KR); Jae-Won Kim, Seoul (KR); Jeong-Ho Park, Seoul (KR); Hyuk-Min Son, Gwangmyeong-si (KR); Hyun-Kyu Yu, Suwon-si (KR); Su-Ryong Jeong, Yongin-si (KR); Cheol Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/844,983

(22) Filed: Sep. 3, 2015

(65) Prior Publication Data

US 2016/0072563 A1   Mar. 10, 2016

(30) Foreign Application Priority Data

Sep. 5, 2014   (KR) ........................ 10-2014-0119136

(51) Int. Cl.
*H04L 1/02*   (2006.01)
*H04B 7/04*   (2017.01)
(Continued)

(52) U.S. Cl.
CPC ......... *H04B 7/0421* (2013.01); *H04B 7/0408* (2013.01); *H04B 7/0413* (2013.01);
(Continued)

(58) Field of Classification Search
CPC ....... H04L 1/0618; H04L 1/06; H04B 7/0434; H04B 7/0452
(Continued)

(56) References Cited

U.S. PATENT DOCUMENTS

2007/0206626 A1* 9/2007 Lee ...................... H04B 7/0417
                                                              370/437
2008/0247475 A1   10/2008 Kim et al.
(Continued)

FOREIGN PATENT DOCUMENTS

JP   2012-521180       9/2012
KR   20120003781 A     1/2012
(Continued)

OTHER PUBLICATIONS

International Search Report and Written Opinion issued for PCT/KR2015/009431 dated Dec. 14, 2015, 8 pgs.
(Continued)

*Primary Examiner* — Khai Tran (57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). A method for channel-related information feedback in a beamforming system, performed by a transmitter is provided. The method includes determining whether a receiver is to feed back gain information about an effective channel established between the transmitter and the receiver using channel-related information between the transmitter and the receiver, notifying the receiver of a feedback mode indicating whether the gain information is to be fed back, upon receipt of feedback information configured based on the feedback mode from the receiver, reconfiguring the effective channel based on the feedback information, and transmitting a signal on the reconfigured effective channel.

20 Claims, 4 Drawing Sheets

(51) Int. Cl.
  *H04L 5/00* (2006.01)
  *H04B 7/06* (2006.01)
  *H04B 7/08* (2006.01)
  *H04B 7/0408* (2017.01)
  *H04B 7/0413* (2017.01)
  *H04B 7/0456* (2017.01)

(52) U.S. Cl.
  CPC ......... *H04B 7/0456* (2013.01); *H04B 7/0617* (2013.01); *H04B 7/0619* (2013.01); *H04B 7/0626* (2013.01); *H04B 7/0639* (2013.01); *H04B 7/084* (2013.01); *H04L 5/0048* (2013.01)

(58) Field of Classification Search
  USPC ....... 375/267, 219, 260, 295, 285, 346, 347, 375/349; 370/241, 329
  See application file for complete search history.

(56) References Cited

U.S. PATENT DOCUMENTS

| | | | |
|---|---|---|---|
| 2012/0003945 A1 | 1/2012 | Liu et al. | |
| 2012/0134335 A1* | 5/2012 | Jia | H04B 7/0417 370/329 |
| 2013/0114763 A1 | 5/2013 | Park | |
| 2013/0279460 A1 | 10/2013 | Kim et al. | |
| 2013/0301454 A1 | 11/2013 | Seol et al. | |
| 2014/0194132 A1 | 7/2014 | Lim et al. | |
| 2014/0241274 A1 | 8/2014 | Lee et al. | |
| 2014/0269577 A1* | 9/2014 | Hammarwall | H04B 7/0634 370/329 |
| 2014/0321563 A1 | 10/2014 | Park et al. | |
| 2015/0372795 A1* | 12/2015 | Wu | H04L 5/0057 370/329 |

FOREIGN PATENT DOCUMENTS

| | | |
|---|---|---|
| KR | 20140051175 A | 4/2014 |
| KR | 20140128658 A1 | 11/2014 |
| WO | WO 2012/002747 A2 | 1/2012 |

OTHER PUBLICATIONS

Intel Corporation, "Discussion on PMI Test Cases for eDL-MIMO TDD", 3GPP TSG-RAN WG4 (Radio) Meeting #60, R4-114094, dated Aug. 20, 2011, 4 pgs.

LG Electronics, "Discussion on Frequency-Domain Granularity and MU-CQI", 3GPP TSG-RAN WG1 Meeting #72bis, R1-131289, dated Apr. 6, 2013, 3 pgs.

* cited by examiner

METHOD AND APPARATUS FOR CHANNEL-RELATED INFORMATION FEEDBACK IN A BEAMFORMING SYSTEM

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Sep. 5, 2014 and assigned Serial No. 10-2014-0119136, the entire disclosure of which is incorporated herein by reference.

TECHNICAL FIELD

The present disclosure relates to a method and apparatus for channel-related information feedback in a beamforming system.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To satisfy ever-increasing demands for wireless data traffic in a wireless communication system, techniques for supporting higher data rates have been developed. In one of the techniques, a BeamForming (BF)-based Base Station (BS) uses a wide frequency band in a millimeter Wave (mmWave) band to thereby significantly increase the capacity of a cellular system.

A Multiple Input Multiple Output (MIMO) system, which is considered in the legacy Long Term Evolution-Advanced (LTE-A) standard, has a plurality of digital paths or Radio Frequency (RF) chains to transmit a plurality of pieces of information to a single user or multiple users. MIMO communication through such a plurality of digital paths brings about a performance gain such as a diversity gain or a multiplexing gain. However, if the number of digital paths is increased to achieve a higher gain, problems may be produced in terms of synchronization between digital paths, cost, and operation complexity.

In this context, a hybrid BF system is considered to achieve high communication capacity efficiently in an mmWave band. To transmit a signal to a single user or multiple users in the hybrid BF system, a BS receives a feedback of channel-related information from a User Equipment (UE) and transmits and receives signals based on the feedback.

Accordingly, there is a need for acquiring accurate channel-related information from a UE by a BS in an environment where a plurality of pieces of information are transmitted to a single user or multiple users.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide, for use in a method and apparatus for transmitting a feedback of accurate channel-related information by a UE in an environment where a plurality of pieces of information are transmitted to a single user or multiple users.

In accordance with an aspect of the present disclosure, there is provided a method for channel-related information feedback in a beamforming system, performed by a transmitter. The method includes determining whether a receiver is to feed back gain information about an effective channel established between the transmitter and the receiver using channel-related information between the transmitter and the receiver, notifying the receiver of a feedback mode indicating whether the gain information is to be fed back, upon receipt of feedback information configured based on the feedback mode from the receiver, reconfiguring the effective channel based on the feedback information, and transmitting a signal on the reconfigured effective channel.

In accordance with another aspect of the present disclosure, there is provided a method for channel-related information feedback in a beamforming system, performed by a receiver. The method includes, upon receipt of a reference signal from a transmitter, checking a feedback mode indicating whether gain information about an effective channel established with the transmitter is to be fed back, received from the transmitter, and configuring channel-related information for the reference signal in correspondence with the feedback mode and feeding back the channel-related information to the transmitter.

In accordance with another aspect of the present disclosure, there is provided a transmitter for channel-related information feedback in a beamforming system. The transmitter includes a controller configured to determine whether a receiver is to feed back gain information about an effective channel established between the transmitter and the receiver using channel-related information between the transmitter and the receiver to notify the receiver of a feedback mode indicating whether the gain information is to be fed back through a transceiver, an effective channel reconfigurer configured to, upon receipt of feedback information configured based on the feedback mode from the receiver, reconfigure the effective channel based on the feedback information, and a transceiver configured to transmit a signal on the reconfigured effective channel.

In accordance with another aspect of the present disclosure, there is provided a receiver for channel-related information feedback in a beamforming system. The receiver includes a controller configured to, upon receipt of a reference signal from a transmitter, check a feedback mode indicating whether gain information about an effective channel established with the transmitter is to be fed back, received from the transmitter, a feedback information generator configured to configure channel-related information for the reference signal in correspondence with the feedback mode, and a transceiver configured to feed back the channel-related information to the transmitter.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure provide a method and apparatus for transmitting accurate channel-related information about an effective channel to a Base Station (BS) by a User Equipment (UE) in an environment where a plurality of signals are transmitted to a single user or multiple users.

Figure 1:
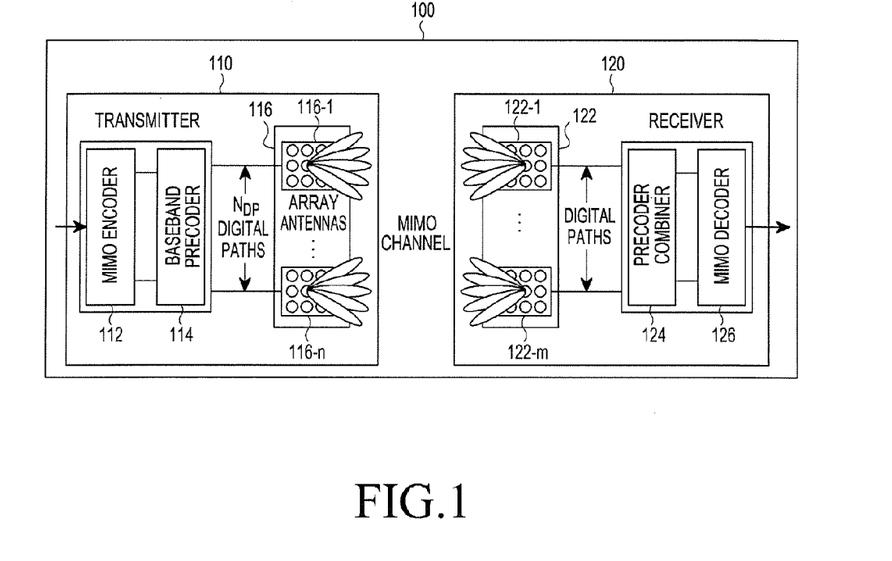
FIG. 1 illustrates a hybrid BeamForming (BF) system to which various embodiments of the present disclosure are applicable.

FIG. 1 is a block diagram of a hybrid BeamForming (BF) system to which various embodiments of the present disclosure are applicable.

Referring to FIG. 1, a hybrid BF system 100 includes, for example, a transmitter 110 and a receiver 120. The transmitter 110 includes a predetermined number of array antennas 116 to form Multiple Input Multiple Output (MIMO) channels. For the convenience of description, it is assumed that there are n array antennas 116-1 to 116-n. Each of the array antennas 116-1 to 116-n includes a predetermined number of antenna elements. Although each array antenna includes a different number of antenna elements, each of the array antennas 116-1 to 116-n includes the same number of antenna elements herein, by way of example. The receiver 120 also includes array antennas 122-1 to 122-m having the same configurations as the array antennas 116-1 to 116-n. It is assumed that the receiver 120 has m antennas 122 in total, by way of example. Herein, m and n are natural numbers equal to or larger than 1. According to various embodiments, m and n is set to the same or different values.

The transmitter 110 is shown in FIG. 1 as including a MIMO encoder 112 and a baseband precoder 114 for encoding and precoding a transmission signal, and the receiver 120 is shown in FIG. 1 as including a baseband combiner 124 and a MIMO decoder 126 for combining and decoding signals received through the array antennas 122. Each of the transmitter 110 and the receiver 120 are shown as including schematic components, for the convenience of description. However, the transmitter 110 and the receiver 120 include more detailed components according to various embodiments of the present disclosure.

In the hybrid BF communication system having the above configuration, when the transmitter transmits a plurality of signals to a single user or multiple users (hereinafter, referred to as 'multiplexing transmission'), the transmitter uses a feedback of channel-related information received from the receiver, for various purposes. For example, the transmitter applies a precoding scheme based on the channel-related information feedback, for multiplexing transmission. Therefore, interference between signals for a single user having multiple antennas or interference between multiple users can be decreased and thus the transmission capacity of the system can be increased.

It is assumed that the hybrid BF communication system uses Frequency Division Duplexing (FDD). In certain embodiments, upon receipt of a reference signal from the transmitter, the receiver estimates channel-related information between the transmitter and the receiver using the received reference signal. The receiver feeds back the estimated channel-related information to the transmitter. In a Long Term Evolution-Advanced (n LTE-A) system, for example, the feedback of the estimated channel-related information is called a Precoding Matrix Indicator (PMI) feedback. The transmitter uses the PMI feedback received from the receiver in forming a precoding matrix for the receiver. Specifically, the transmitter and the receiver pre-store precoding matrices and the PMI indicate one of the precoding matrices.

The receiver further transmits a Channel Quality Indicator (CQI) to the transmitter so that the transmitter uses the CQI in scheduling and Modulation and Coding Scheme (MCS) selection.

If the hybrid BF system 100 operates in a millimeter Wave (mmWave) band, it has a very small antenna form factor due to the high frequency band. Accordingly, a BF system using a plurality of array antennas is readily configured. Beamforming is implemented in the mmWave band by applying a different phase shift value to each array antenna element and thus steering beams in an intended direction. To compensate for a high pathloss in the mmWave band, the array antennas is arranged in such a manner that each antenna element comprises a narrow beamwidth.

Therefore, the hybrid BF communication system 100 differs from a legacy MIMO system in that beams are formed using an array antenna.

Specifically, if the above-described hybrid BF communication system is configured for multiple users, as a beam from each array antenna gets sharper along with an increased number of array antennas, the antenna has a very different effective channel gain. For example, in the case of Beam Division Multiple Access (BDMA) communication in which a single beam delivers a signal only to one user, the gain of an effective channel for an antenna corresponding to the single beam has a very high gain compared to the other antennas, and the other antennas include effective channel gains close to '0'.

One of legacy wireless communication standards, LTE-A uses a unitary matrix-based codebook, for a PMI feedback. A unitary matrix is characterized by a small channel gain deviation and uniform channel gains. Therefore, if the unitary matrix-based codebook is used for multiplexing transmission in the hybrid BF system, it is hard to represent MIMO channels accurately.

Accordingly, various embodiments of the present disclosure provide a method for feeding back effective channel-related information, for accurate MIMO communication. Specifically, after the receiver estimates an effective channel with respect to the transmitter, the receiver feeds back gain information about effective channel elements as well as PMI information as the effective channel-related information to the transmitter. There is a situation that obviates the need for feeding back gain information about effective channel elements according to the characteristics of the system or a transmission mode. For example, the situation corresponds to a system having a wide beamwidth. In various embodiments of the present disclosure, therefore, the number of feedback bits is flexibly determined by using the gains of effective channel elements between the transmitter and the receiver, estimated by the receiver and forming an independent codebook for each PMI. As a consequence, system overhead can be reduced.

Figure 2:
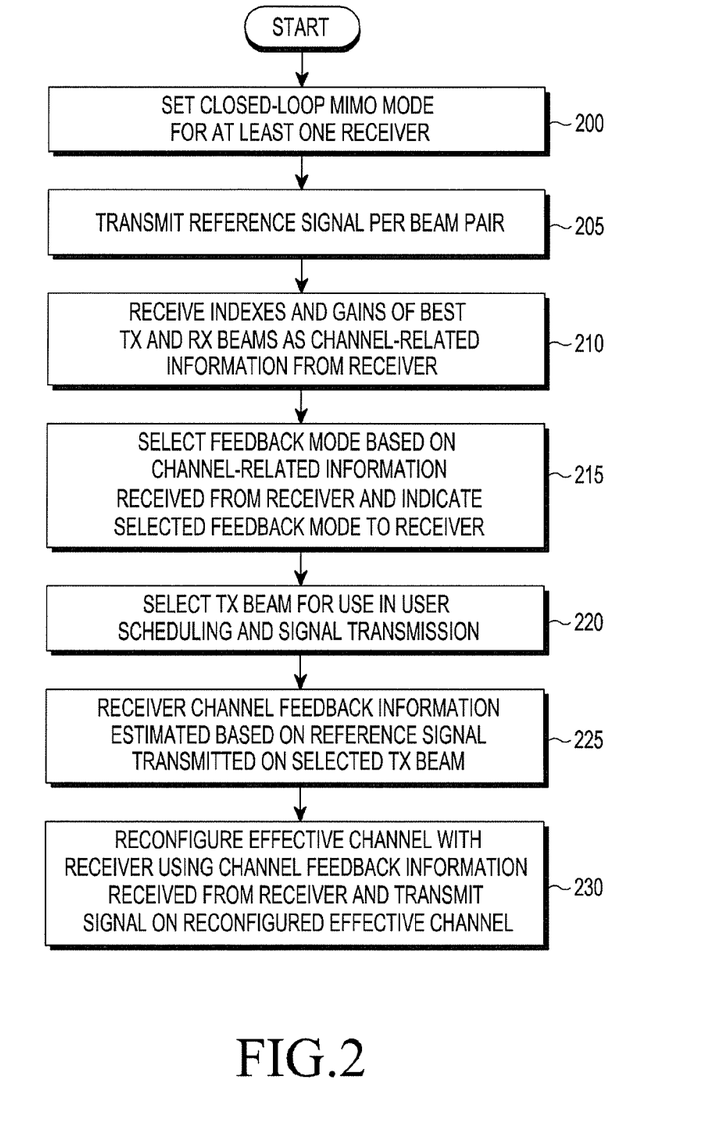
FIG. 2 illustrates an overall operation of a transmitter according to various embodiments of the present disclosure.

FIG. 2 is a flowchart illustrating an overall operation of a transmitter according to various embodiments of the present disclosure. The transmitter performs multiplexing transmission to at least one user.

Referring to FIG. 2, the transmitter sets a closed-loop MIMO mode for at least one receiver in operation 200. For the convenience of description, it is assumed that the transmitter sets the closed-loop MIMO mode for a receiver having an antenna array with a predetermined number of antenna elements. According to certain embodiments, the transmitter determines whether to set the closed-loop MIMO mode for the receiver in consideration of feedback information received from the receiver after transmitting a reference signal per beam path in operation 205.

In operation 205, the transmitter transmits a reference signal for each beam path defined by a Transmission (Tx) beam corresponding to each of transmission antenna elements of the transmitter and a Reception (Rx) beam corresponding to each of reception antenna elements of the receiver, by the Tx beam. In other words, a Tx beam corresponding to one transmission antenna element is placed in a one to one pair relationship with each of Rx beams corresponding to the reception antenna elements.

In operation 210, the transmitter receives the indexes and gain of best Tx and Rx beams as a feedback of channel-related information. The indexes of the best Tx and Rx beams are the indexes of a Tx beam and an Rx beam corresponding to a Tx-Rx beam combination having the highest of the signal strengths of reference signals received from the transmitter by the receiver.

In operation 215, the transmitter selects a feedback mode based on the channel-related information received from the receiver and notifies the receiver of the selected feedback mode. Specifically, according to various embodiments, the feedback mode is determined according to the beamwidth of a Tx beam carrying a reference signal to the receiver or the number of antenna elements in an array antenna, the channel-related information acquired from the receiver, and a transmission mode supported by the receiver, for example, a current MIMO mode being a Single User (SU) mode or a Multiple User (MU) mode.

According to various embodiments of the present disclosure, one of a mode in which channel-related information fed back from a UE includes a PMI and a mode in which channel-related information includes both a PMI and gain information about effective channel elements is selected as the feedback mode. The feedback mode is indicated to the receiver, for example, on a Physical Downlink Control Channel (PDCCH). For example, the feedback mode is configured in one bit to indicate whether gain information about effective channel elements is transmitted or not according to various embodiments of the present disclosure.

According to various embodiments of the present disclosure, three exemplary criteria are used to determine a feedback mode. One of the criteria is the number of antenna elements in a transmitter and a beamwidth between the antenna elements. If the condition that the number of antenna elements is equal to or larger than a predetermined number is satisfied, the beamwidth between the antenna elements is relatively narrow. Since the receiver needs to perform more accurate effective channel estimation, the mode for transmitting both a PMI and gain information about effective channel elements is selected as the feedback mode of the receiver. On the other hand, if the number of antenna elements is less than the predetermined number, the beamwidth between the antenna elements gets relatively wide and the receiver performs channel estimation easily. Therefore, the mode for transmitting only a PMI is selected as the feedback mode of the receiver. Then, if the difference between the values of effective channel elements that form an effective channel configured between the transmitter and the receiver is equal to or larger than a predetermined threshold, relatively narrow transmission beams is formed. Thus, the mode for transmitting both a PMI and gain information about the effective channel elements is selected as the feedback mode of the receiver. On the other hand, if the difference between the values of effective channel elements that form an effective channel configured between the transmitter and the receiver is less than the predetermined threshold, relatively wide transmission beams is formed. Therefore, the mode for transmitting only a PMI is selected as the feedback mode of the receiver.

Finally, the channel environment between the transmitter and the receiver is relatively poor in an MU-MIMO mode, compared to an SU-MIMO mode. Accordingly, the mode for transmitting both a PMI and gain information about the effective channel elements is selected as the feedback mode of the receiver. In the SU-MU mode, the mode for transmitting only a PMI is selected as the feedback mode of the receiver.

In operation 220, the transmitter selects a Tx beam for use in determining a receiver to receive a transmission signal from the transmitter, that is, user scheduling and transmission of the signal. It is assumed that a Tx beam corresponding to the indexes of best Tx and Rx beams is selected. The transmitter transmits a reference signal to the selected receiver by the selected Tx beam. In another example, if each of a plurality of users selects two Tx beams for the transmitter, the selected Tx beams is different for each user. In certain embodiments, the transmitter selects two best Tx beams from among the user-selected Tx beams.

In operation 225, the transmitter transmits a reference signal by the selected Tx beam and then receives channel feedback information based on the reference signal from the receiver according to various embodiments of the present disclosure. The channel feedback information is configured according to the indicated feedback mode. For example, if the indicated feedback mode is the mode for transmitting both a PMI and gain information about effective channel elements, the feedback information includes both a PMI and gain information about effective channel elements. Or if the indicated feedback mode is the mode for transmitting only a PMI, the channel feedback information includes only a PMI.

After reconfiguring an effective channel with respect to the receiver using the channel feedback information, the transmitter transmits a signal to the receiver on the reconfigured effective channel in operation 230.

Now, a description will be given of a method for selecting channel feedback information between a transmitter and a receiver, a method for selecting gain information about effective channel elements, which is included in the channel feedback information, a method for setting the number of feedback bits of the gain information, and a method for determining whether to feed back the gain information according to system characteristics according to embodiments of the present disclosure. For the convenience of description, it is assumed that a number of RF chain of the receiver one.

Figure 3:
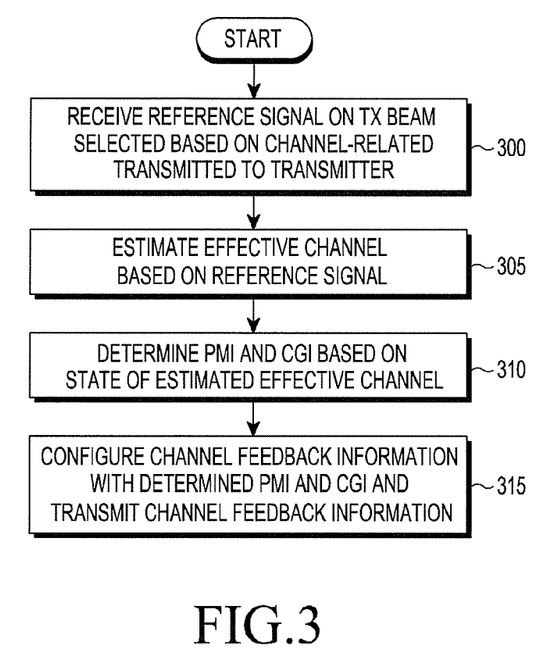
FIG. 3 illustrates an operation of a receiver according to various embodiments of the present disclosure.

FIG. 3 is a flowchart illustrating an operation of a receiver according to various embodiments of the present disclosure.

Referring to FIG. 3, it is assumed for the convenience of description that the receiver has been selected through user scheduling of the transmitter and a reference signal has been transmitted to the receiver by a Tx beam in operation 220. Thus, the receiver receives the reference signal by the Tx beam in operation 300 and estimates an effective channel with respect to the transmitter based on the reference signal in operation 305. The estimated effective channel is represented as [Equation 1]. For the convenience of description, the transmitter assumes an MU-MIMO mode in which MIMO communication is conducted with K individual users each using a single digital path. Herein, a digital path per user is connected to a corresponding array antenna and thus a beam gain is obtained. This effect is reflected in the effective channel estimated by the receiver represented by [Equation 1]. According to another embodiment, the same thing is applicable to the SU-MIMO mode in which a single user uses multiple digital paths.

$$\tilde{H}_{\text{eff}} = \begin{bmatrix} \tilde{h}_1 \\ \tilde{h}_2 \\ \tilde{h}_3 \end{bmatrix} = \begin{bmatrix} \tilde{h}_{11} & \cdots & \tilde{h}_{N_{DP}} \\ \vdots & \ddots & \vdots \\ \tilde{h}_{K1} & \cdots & \tilde{h}_{KN_{DP}} \end{bmatrix}$$ [Equation 1]

where $N_{DP}$ is the number of digital paths or RF chains between the transmitter and K users, and K is the number of users, that is, the number of receivers. Each $\tilde{h}_{ij}$ of effective channel elements that form the effective channel is expressed as, for example, a gain $\tilde{h}_{ij} = |\tilde{h}_{ij}| \angle \tilde{h}_{ij}$ and an angle $\angle \tilde{h}_{ij}$ where i is a user index and j is the index of a digital path in the transmitter, defined by a Tx beam and an Rx beam. $\tilde{h}_{ij}$ represents a channel between a $j^{th}$ digital path and an $i^{th}$ user, measured by the transmitter.

In operation 310, the receiver determines channel feedback information corresponding to the estimated effective channel. According to various embodiments of the present disclosure, the channel feedback information includes gain information about effective channel elements estimated by the receiver as well as a PMI. It is assumed that since the channel feedback information is configured according to a feedback mode indicated by the transmitter, the transmitter indicates the mode for transmitting both a PMI and gain information about effective channel elements to the receiver.

Specifically, the receiver determines channel feedback information corresponding to the estimated effective channel by different algorithms according to various embodiments of the present disclosure. According to various embodiments of the present disclosure, the receiver determines the channel feedback information in one of three schemes, that is, joint search, sequential search, and independent search. The channel feedback information further includes gain information about effective channel elements estimated by the receiver according to various embodiments of the present disclosure. The gain information is determined based on a gain codebook corresponding to a set of candidate gain vectors for the effective channel elements. It is assumed that the gain codebook is pre-stored in both the transmitter and the receiver according to various embodiments of the present disclosure. According to various embodiments of the present disclosure, the gain information includes at least one of a Channel Gain Index (CGI) being the index of a gain codebook corresponding to the gain vectors of the effective channel elements estimated by the receiver and a Permutation Matrix Index (PTI) indicating the positions of the gain vectors in the codebook.

Channel Feedback Information Selection Methods

1) Joint Search

According to various embodiments of the present disclosure, the receiver selects a set of gain vectors and a set of precoding vectors that satisfy [Equation 2] based on the estimated effective channel with respect to the transmitter by the join search scheme, and configures information corresponding to each of the selected sets as channel feedback information to be transmitted to the transmitter.

$$\{g_k^*, c_k^*\} = \max_{g_k, c_k} \|\tilde{h}_k \cdot (g_k * c_k)^H\|^2 \qquad \text{[Equation 2]}$$

Where $g_k$ is one of element vectors included in a set $[n_1^1 \ldots n_{2^{N_{CGI}}}^T]^T$ of gain vectors selected by user k, that is, receiver k in the joint search scheme ($g_k \in [n_1^1 \ldots n_{2^{N_{CGI}}}^T]^T$), $c_k$ is one of element vectors included in a set $[m_1^1 \ldots m_{2^{N_{PMI}}}^T]^T$ or precoding vectors selected by receiver k in the joint search scheme, $N_{CGI}$ is the number of feedback bits of a CGI fed back by each UE, $2^{N_{CGI}}$ is the number of candidate gain vectors that form a gain codebook, $N_{PMI}$ is the number of feedback bits of a PMI fed back by each UE, $2^{N_{PMI}}$ is the number of candidate gain vectors that form a precoding codebook, and an operator * represents an element-wise multiplication. Compared to transmission of a PMI only, determination of both a PMI and a CGI to be fed back to the transmitter in the above-described joint search scheme increases complexity. However, the transmitter more accurately recovers an effective channel in view of the CGI. Therefore, high performance is expected.

2) Sequential Search

According to various embodiments of the present disclosure, the receiver determines channel feedback information to be transmitted to the transmitter in the sequential search scheme. In the sequential search scheme, the receiver determines the best value of one of $c_k$ and $g_k$, and then searches for the best value of the other.

Specifically, receiver k selects a reference $g_k$ from among gain vectors of an effective channel estimated by receiver k and determines a PMI corresponding to a precoding codebook $c_k$ satisfying [Equation 3] as channel feedback information to be transmitted to the transmitter based on the selected reference $g_k$.

$$c_k^* = \max_{c_k} \|\tilde{h}_k \cdot (g_k * c_k)^H\|^2 \qquad \text{[Equation 3]}$$

Or receiver k selects a reference $c_k$ from among precoding vectors of the effective channel estimated by receiver k and determines a CGI corresponding to $g_k$ satisfying [Equation 4] as channel feedback information to be transmitted to the transmitter on the selected reference $c_k$.

$$g_k^* = \max_{g_k} \|\tilde{h}_k \cdot (g_k * c_k)^H\|^2 \qquad \text{[Equation 4]}$$

3) Independent Search

According to various embodiments of the present disclosure, the receiver determines channel feedback information to be transmitted to the transmitter in the independent search scheme. Since the receiver independently uses $c_k$ and $g_k$ to be fed back to the transmitter, the independent search scheme advantageously reduces computation complexity, relative to other schemes.

Specifically, the receiver determines a CGI indicating $g_k$ satisfying [Equation 5] for the estimated effective channel to be channel feedback information to be transmitted to the transmitter. Likewise, the receiver determines a PMI corresponding to $c_k$ satisfying [Equation 6] for the estimated effective channel to be a PMI feedback to be transmitted to the transmitter.

$$g_k^* = \max_{g_k} \|[|\tilde{h}_k| \ldots |\tilde{h}_{k n_{DP}}|] \cdot g]_k^H\|^2 \qquad \text{[Equation 5]}$$

$$c_k^* = \max_{c_k} \|\tilde{h}_k \cdot c_k^H\|^2 \qquad \text{[Equation 6]}$$

In operation 315, the receiver configures channel feedback information with information indicating a selected $g_k$ and a PMI that are selected in one of the above-described three schemes and transmits the channel feedback information to the transmitter.

Gain Codebook Configuration Method

According to various embodiments of the present disclosure, a codebook for an effective channel between a transmitter and a receiver is configured as follows.

To represent the gain values of various effective channel elements, the size of a codebook increases. Depending on system characteristics, it occurs that it is not necessary to feed back gain information about effective channel elements. Accordingly, a gain codebook and a precoding codebook are independently managed according to various embodiments of the present disclosure. In the following Algorithm 2, Algorithm 3, and Algorithm 4, each user, that is, each receiver feeds back an effective channel gain difference per digital path and a gain magnitude order.

The method for configuring a gain codebook for an effective channel is described separately in regard to four algorithms according to various embodiments of the present disclosure.

1) Algorithm 1

According to various embodiments of the present disclosure, a gain codebook Q is formed using actual gain values of effective channel elements in Algorithm 1. Thus, Q is a real matrix of size $2^{N_{CGI}} \times N_{DP}$. A gain codebook for an effective channel is configured in various quantization schemes in various embodiments of the present disclosure. For example, uniform quantization, non-uniform quantization, or beamwidth-based quantization is used.

2) Algorithm 2

According to various embodiments of the present disclosure, if Algorithm 2 is used, each user, that is, each receiver configures a gain codebook for an effective channel largely in three steps.

In a first step, each receiver normalizes gain vectors using the maximum of the gain values of effective channel elements with respect to the transmitter, estimated by the receiver in order to represent the maximum gain as 1, and then arranges the normalized gain vectors in a descending order. Specifically, it is assumed that there are two digital paths between each of two users, having a single antenna and a transmitter. Then, it is also assumed that user 1 has gain values of 4 and 1 for the gain vectors of the digital paths and user 2 has gain values of 0.5 and 5 for the gain vectors of the digital paths. Since the maximum gain is 4 for user 1, the gain values are normalized to 1 and 0.25 using 4. In the same manner, since the maximum gain is 5 for user 2, the gain values are normalized to 0.1 and 1 using 5.

$$\tilde{h}_{1,\mathit{eff,gain}}=[4\ 1]\rightarrow[1\ 0.25]$$

$$\tilde{h}_{2,\mathit{eff,gain}}=[0.5\ 5]\rightarrow[0.1\ 1] \quad \text{[Equation 7]}$$

In another example, if $N_{DP}$ digital paths are established for user k from the transmitter and the maximum gain of user k is $|\tilde{h}_{ij}|$, normalized gain vectors are arranged in a descending order as illustrated in [Equation 8].

$$\tilde{h}_k^{gain}=1\ \ldots\ \tilde{h}_{kN_{DP}}^{gain} \quad \text{[Equation 8]}$$

In a second step, the remaining vectors except for the gain vector having the maximum value among the normalized gain vectors arranged in a descending order, that is, a gain vector having the second largest gain value to a gain vector having an $N_{DPth}$ gain value $[\tilde{h}_{k2}^{gain}\ \ldots\ \tilde{h}_{kN_{DP}}^{gain}]$ are compared with a preconfigured Q. Then, gain vectors approximate to $[\tilde{h}_{k2}^{gain}\ \ldots\ \tilde{h}_{kN_{DP}}^{gain}]$ are selected from among the gain vectors of Q and a PTI indicating the positions of the selected gain vectors is selected. According to various embodiments of the present disclosure, Q is configured in various quantization schemes and a real matrix of size $2^{N_{CGI}} \times (N_{DP}-1)$ including gain values of the gain vectors of effective channel elements arranged in an order of smaller gain values, that is, row vectors arranged in a descending order is assumed.

In a third step, the receiver selects a PTI indicating the order of the magnitudes of the gain values of the selected gain vectors. In the foregoing example, user 1 will select the normalized gain 0.25 and user 2 will select the normalized gain 0.1 in the second and third steps. For example, if Q=[0.1 0.3 0.5 0.7], user 1 will select a quantized gain value of 0.3 approximate to 0.25 and user 2 will select a quantized gain value of 0.1 equal to 0.1. Then, user 1 and user 2 configure a permutation matrix T indicating the quantized gain values selected from Q, $$T = \begin{bmatrix} 1 & 2 \\ 2 & 1 \end{bmatrix}.$$

Herein, T represents channel sizes in the first and second digital paths for the respective user 1 and user 2. For example, T indicates that user 1 has a larger channel size in the second digital path than in the first digital path. Then, user 1 and user 2 select a PTI corresponding to T and configure channel feedback information with the PTI.

3) Algorithm 3

In Algorithm 3 according to various embodiments of the present disclosure, Q includes row vectors with the gain values of effective channel elements, like Q in Algorithm 2. Q also is configured to include the order of the gain values of the elements of each row vector. In certain embodiments, there is no need for PTI selection in the third step of Algorithm 2.

4) Algorithm 4

In Algorithm 4 according to various embodiments of the present disclosure, Q includes one row vector repressed as Q=[0.1 0.3 0.5 0.7]. In certain embodiments, the receiver configures channel feedback information only with a PTI of a CGI selected from Q and feed back the channel feedback information. Then, the receiver acquires the gain vector based on the PTI from the known Q and reconfigures an effective channel using the acquired gain vector. In the same manner, the element vectors of Q are represented by quantization in various manners. In various embodiments using Algorithm 4, system overhead can be remarkably reduced since NCGI=0.

If channel feedback information is configured with a PTI according to the foregoing Algorithms 2, 3, and 4, the number of feedback bits of the PTI is calculated by NPTI=NDP!. All magnitude order combinations of the gain vectors of effective channel elements are represented using the number of feedback bits of the PTI. In this case, the gain values of effective channel elements are quantized by uniform quantization or non-uniform quantization or by beamwidth-based quantization.

Method for Determining Number of Feedback Bits of CGI

According to various embodiments of the present disclosure, when the receiver feeds back a CQI to the transmitter, the number of feedback bits of the CGI is determined according to various beamwidths. As described before, the size of an effective channel between the transmitter and the receiver is closely related to a beamwidth in the hybrid BF communication system. For example, if a narrow beamwidth is set between Tx and Rx beams or the number of array antenna elements mapped to digital paths increases, the gain values of elements of the effective channel that the receiver recognizes is very different. Accordingly, if a narrow beamwidth is set, a large number of ($N_{CGI}$) bits are set, compared to a system having a relatively wide beamwidth.

According to another embodiment, when the number $N_{CGI}$ of feedback bits is determined for a CGI, whether MU or SU is supported is considered. Every Tx beam is highly likely to be transmitted in a direction of a single user in an SU-MIMO system. Accordingly, a large number of ($N_{CGI}$) bits are set in an MU-MIMO system, compared to an SU-MIMO system.

Method for Determining Whether to Feed Back Gain Information about Effective Channel According to System Characteristics According to various embodiments of the present disclosure, if a CGI feedback does not contribute to improvement of system performance or the contribution is negligibly small, setting $N_{CGI}$ to 0 and $N_{PTI}$ to 0 leads to decreased system overhead for feedback.

Figure 4:
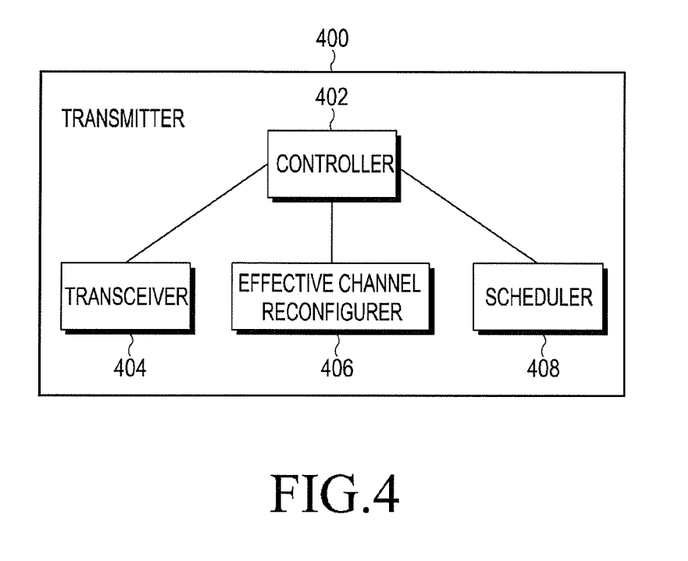
FIG. 4 illustrates a transmitter according to various embodiments of the present disclosure.
Figure 5:
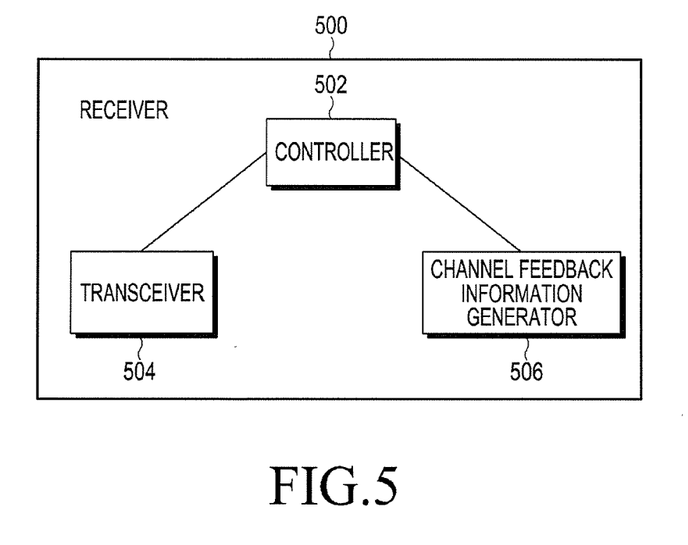
FIG. 5 illustrates a receiver according to various embodiments of the present disclosure.

While a transmitter and a receiver are shown in FIGS. 4 and 5 as being configured with detailed components according to operations of the transmitter and the receiver according to various embodiments of the present disclosure, some units is integrated into one unit or a unit is divided into sub-units.

FIG. 4 is a block diagram of a transmitter according to various embodiments of the present disclosure.

Referring to FIG. 4, a transmitter 400 includes a controller 402, a transceiver 404, an effective channel reconfigure 406, and a scheduler 408. The transmitter 400 operates in the manner described before with reference to FIG. 2. Thus, a redundant description of FIG. 2 will not be provided herein. The transceiver 404 transmits a reference signal to a receiver and receives channel-related information and channel feedback information from the receiver according to various embodiments of the present disclosure.

The controller 402 determines a feedback mode for the receiver based on the number of antennas in the transmitter 400, a beamwidth per antenna of the transmitter 400, whether the receiver is a single user or multiple users, and the channel-related information received from the receiver, which is based on the reference signal transmitted to the receiver. Then, the controller 402 notifies the receiver of the determined feedback mode through the transceiver 404.

If the channel feedback information received through the transceiver 404 includes gain information about an effective channel established with the receiver, the effective channel reconfigure 406 reconfigures the effective channel based on the gain information. Subsequently, the controller 402 controls the transceiver 404 to transmit a signal to the receiver on the reconfigured effective channel.

The scheduler 408 allocates resources for channel transmission and reception to and from the receiver.

FIG. 5 is a block diagram of a receiver according to various embodiments of the present disclosure.

Referring to FIG. 5, a receiver 500 includes a controller 502, a transceiver 504, and a feedback information generator 506. The receiver 500 operates in the manner described before with reference to FIG. 3. Thus, a redundant description of FIG. 3 will not be provided herein.

The transceiver 504 receives a reference signal and information about a feedback mode from a transmitter and transmits channel-related information and channel feedback information configured based on the reference signal and the feedback mode by the feedback information generator 506 to the transmitter.

Upon recognition of reception of the reference signal through the transceiver 504, the controller 502 checks the feedback mode and the feedback information generates channel feedback information corresponding to the feedback mode. The controller 502 also determines the number of feedback bits of the gain information, taking into account at least one of a Tx beam per antenna of the transmitter and the number of users and controls the feedback information generator 506 to generate gain information corresponding to the number of feedback bits.

If the feedback mode is for feedback of gain information about an effective channel to the transmitter, the feedback information generator 506 generates the gain information in one of the afore-described three schemes. As described before, as the receiver additionally feeds back gain information about an effective channel to the transmitter according to various embodiments of the present disclosure, the transmitter reconfigures a more accurate effective channel, thereby increasing system transmission capacity.

As is apparent from the foregoing description of the present disclosure, since a receiver feeds back effective channel-related information as well as a PMI to a transmitter in a feedback mode determined based on a channel state, the transmitter can recover a channel close to an actual channel, thereby increasing the transmission capacity of a system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving feedback information by a transmitter in a beam forming system, the method comprising:
    determining whether a receiver is to feed back gain information about an effective channel established with the receiver using feedback mode related information between the transmitter and the receiver;
    notifying the receiver of a feedback mode comprising an indicator indicating whether the gain information is to be fed back;
    if the indicator is determined as a value indicating that the gain information is to be fed back, receiving the feedback information comprising the gain information; and
    reconfiguring the effective channel based on the gain information, and transmitting a signal on the reconfigured effective channel.

2. The method of claim 1, wherein the feedback mode related information includes at least one of information about a number of antennas in the transmitter, information about a beam width of each of the antennas of the transmitter, a comparing result of a difference between a plurality of elements of the effective channel with a difference threshold, and a transmission mode indicating a single user mode or a multiple users mode.

3. The method of claim 2, wherein determining whether the receiver is to feed back gain information comprises:
    if the number of antennas is greater than an antenna number threshold or if a difference between the plurality of elements of the effective channel is greater than the difference threshold, or if the transmission mode indicates the multiple users mode, determining the indicator as the value.

4. The method of claim 1, wherein the gain information is one of a magnitude and position of a gain value in a codebook pre-shared with the receiver, and the codebook is a set of gain values of element vectors forming the effective channel.

5. The method of claim 1, wherein a number of bits indicating the gain information is determined based on a number of transmission beams of the transmitter and a number of users.

6. A method for transmitting feedback information by a receiver in a beam-forming system the method comprising:
    if a reference signal is received from a transmitter, transmitting channel-related information between the transmitter and the receiver;
    receiving, from the transmitter, feedback mode information comprising an indicator indicating whether gain information about an effective channel established with the transmitter is to be fed back;
    if the indicator indicates that the gain information is to be fed back, generating feedback information comprising the gain information; and
    transmitting, to the transmitter, the feedback information.

7. The method of claim 6, wherein a value of the indicator is determined based on at least one of information about a number of antennas in the transmitter, information about a beam width of the antennas of the transmitter, a comparing result of a difference between a plurality of elements of the effective channel with a difference threshold, and a transmission mode indicating a single user mode or a multiple users mode.

8. The method of claim 7, wherein if the number of antennas is greater than an antenna number threshold, or if the difference between a plurality of gain elements of the effective channel is greater than the difference threshold, or if the transmission mode indicates the multiple users mode, a value of the indicator is determined as a value indicating that the receiver is to feed back the gain information.

9. The method of claim 6, wherein the gain information is one of a magnitude and position of a gain value in a codebook pre-shared with the receiver, and the codebook is a set of gain values of element vectors forming the effective channel.

10. The method of claim 6, wherein a number of bits indicating the gain information is determined based on a number of transmission beams of the transmitter and a number of users.

11. A transmitter for receiving feedback information in a beamforming system, the transmitter comprising:
a controller configured to determine whether a receiver is to feed back gain information about an effective channel established between the transmitter and the receiver using feedback mode related information between the transmitter and the receiver, and to notify the receiver of a feedback mode comprising an indicator indicating whether the gain information is to be fed back through a transceiver;
if the indicator is determined as a value indicating that the gain information is to be fed back, a receiver is configured to receive the feedback information comprising the gain information;
an effective channel configurer configured to reconfigure the effective channel based on the gain information; and
a transmitter configured to transmit a signal on the reconfigured effective channel.

12. The transmitter of claim 11, wherein the feedback mode related information includes at least one of information about a number of antennas in the transmitter, information about a beam width of each of the antennas of the transmitter, and a transmission mode indicating a single user mode or a multiple users mode.

13. The transmitter of claim 12, wherein if a number of antennas is greater than an antenna number threshold, or if a difference between a plurality of elements of the effective channel is greater than a difference threshold, or if the transmission mode indicates the multiple users mode, the controller is configured to determine the value of the indicator.

14. The transmitter of claim 11, wherein the gain information is one of a magnitude and position of a gain value in a codebook pre-shared with the receiver, and the codebook is a set of gain values of element vectors forming the effective channel.

15. The transmitter of claim 11, wherein the controller determines a number of bits indicating the gain information based on a number of transmission beams of the transmitter and a number of users.

16. A receiver for transmitting feedback information in a beamforming system, the receiver comprising:
a transmitter unit configured to, if a reference signal is received from a transmitter, transmit channel-related information between the transmitter and the receiver
a receiver unit configured to receive, from the transmitter, feedback mode information comprising an indicators indicating whether gain information about an effective channel established with the transmitter is to be fed back;
a controller configured to, if the indicator indicates that the gain information is to be fed back, generate feedback information comprising the gain information; and
the transmitter unit is further configured to transmit, to the transmitter, the feedback information.

17. The receiver of claim 16, wherein a value of the indicator is is determined based on at least one of information about a number of antennas in the transmitter, information about a beam width of the antennas of the transmitter, a comparing result of a difference between a plurality of elements of the effective channel with a difference threshold, and a transmission mode indicating a single user mode or a multiple users mode.

18. The receiver of claim 17, wherein if the number of antennas is greater than an antenna number threshold, or if the difference between a plurality of gain values of the effective channel is greater than the difference threshold, or if the transmission mode indicates the multiple users mode, the indicator indicates that the receiver is to feed back the gain information is determined.

19. The receiver of claim 16, wherein the gain information is one of a magnitude and position of a gain value in a codebook pre-shared with the receiver, and the codebook is a set of gain values of element vectors forming the effective channel.

20. The receiver of claim 16, wherein a number of bits indicating the gain information is determined based on a number of transmission beams of the transmitter and a number of users.

* * * * *